(12) United States Patent
Imamura et al.

(10) Patent No.: US 8,472,047 B2
(45) Date of Patent: Jun. 25, 2013

(54) BILLING AND PRINTING SYSTEM, IMAGE FORMING DEVICE, AND JOB PROCESSING METHOD FOR THE IMAGE FORMING DEVICE

(75) Inventors: Masahiro Imamura, Toyokawa (JP); Tomoko Maruyama, Toyokawa (JP); Kentaro Nagatani, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1207 days.

(21) Appl. No.: 12/349,172

(22) Filed: Jan. 6, 2009

(65) Prior Publication Data
US 2009/0316185 A1   Dec. 24, 2009

(30) Foreign Application Priority Data
Jun. 20, 2008   (JP) .................. 2008-162002

(51) Int. Cl.
*G06F 15/00*   (2006.01)
(52) U.S. Cl.
USPC .......... 358/1.15; 358/1.13; 358/1.14; 399/79; 399/85; 705/39; 705/40
(58) Field of Classification Search
USPC ...................................... 358/1.15
See application file for complete search history.

(56) References Cited

U.S. PATENT DOCUMENTS

| | | | | |
|---|---|---|---|---|
| 5,880,447 A * | 3/1999 | Okada et al. | ................... | 235/380 |
| 6,466,326 B1 * | 10/2002 | Shima | ........................... | 358/1.12 |
| 2002/0113993 A1 * | 8/2002 | Reddy | ........................... | 358/1.15 |
| 2008/0252917 A1 * | 10/2008 | Kuroda et al. | ................ | 358/1.13 |
| 2009/0030837 A1 * | 1/2009 | Knodt | .............................. | 705/40 |

FOREIGN PATENT DOCUMENTS

| | | |
|---|---|---|
| JP | 9-259351 A | 10/1997 |
| JP | 9-297510 A | 11/1997 |
| JP | 10-105007 | 4/1998 |

OTHER PUBLICATIONS

Notification of Reasons for Refusal issued in the corresponding Japanese Patent Application No. 2008-162002 dated Apr. 27, 2010, and an English Translation thereof.

* cited by examiner

*Primary Examiner* — David K Moore
*Assistant Examiner* — Mark Milia
(74) *Attorney, Agent, or Firm* — Buchanan Ingersoll & Rooney PC (57) ABSTRACT

Under a contention between a copy job and a print job, it is possible that a general user misunderstands that the payment he has made for the copy job is mistakenly used on the print job requested by another user. One solution to avoid such undesirable possibility is to display information indicating that the billing process is correctly done. Yet, the general user may fail to notice the display. In view of this, a billing and printing system prevents occurrence of job contention as long as the balance of payment made by a general user remains. An MFP included in the system does not accept any print job if a balance of received payment remains, and does not accept any payment if there is a queued print job.

16 Claims, 10 Drawing Sheets

BILLING AND PRINTING SYSTEM, IMAGE FORMING DEVICE, AND JOB PROCESSING METHOD FOR THE IMAGE FORMING DEVICE

This application is based on an application No. 2008-162002 filed in Japan, the contents of which are hereby incorporated by reference.

BACKGROUND OF THE INVENTION (1) Field of the Invention

The present invention relates to a billing and printing system having an image forming device, and especially to an improvement in billing management and job management under a job contention condition.

(2) Description of the Related Art

Multifunction Peripherals (hereinafter, simply "MFPs") are image forming devices having both copy and print functions. In one typical usage pattern, an MFP is shared among general users and subscriber users. General users are those who are required to pay usage fees in cash or by IC card at a billing device, to use the MFP as a copier. On the other hand, subscriber users are those who are entitled, under contract, to use the MFP as a printer to execute their print jobs from a terminal connected to the MFP via a network.

JP Patent Application Publication No. 09-297510 discloses a technique for correctly executing a billing process. According to the taught technique, an identifier is assigned to the general user who made payment at a billing device and it is judged whether the assigned identifier matches an identifier included in job information.

JP Patent Application Publication No. 09-259351 discloses a technique for informing users that the usage fees are correctly charged, by displaying information about each charged job, such as the name of the job and the name of the host.

SUMMARY OF THE INVENTION

Generally, shared use of an MFP among general and subscriber users involves the risk of contention between a copy job requested by a general user and a print job requested by a subscriber user. Under a job contention condition, it is possible that a print job requested by a subscriber user is executed before a copy job requested by a general user, although the copy job is requested before execution of the print job. In that case, the general user may feel concerned about the possibility that the usage fee he has deposited is mistakenly used for the print job requested by someone else. A general user may have a similar concern in the case where no change is returned after execution of a copy job or where a print job requested by a subscriber user happens to be executed immediately before the general user enters cash into the billing device.

One solution to remove such a concern that a general user may have under a job contention condition is to display, to the general user, information indicating that the billing process is correctly done. Unfortunately, however, if the general user fails to notice the display, his concern cannot be removed.

In view of the above problems, the present invention aims to provide a billing and printing system that prevents occurrence of job contention as long as the balance of payment made by a general user remains. This arrangement minimizes the risk of causing needless concern to the general user. The present invention also aims to provide an image forming device suitable for such a system and a job processing method for such an image forming device.

In order to solve the problems noted above, one aspect of the present invention provides a billing and printing system having a billing device, an external terminal, and an image processing device. The image processing device is connected to the billing device and to the external terminal via a communication network. The billing device includes: a payment information detector operable to detect payment information indicating that a refundable payment is received; a payment information transmitter operable to transmit the payment information to the image forming device; and a refund unit operable to make a refund upon receipt of a refund instruction from the image forming device. The external terminal includes a print job transmitter operable to transmit a print job to the image forming device. The image forming device includes: a payment information receiver operable to receive the payment information from the billing device; a payment manager operable to manage a status of the payment based on the payment information; a print job receiver operable to receive the print job from the external terminal; a print queue operable to store print jobs waiting to be executed by the image forming device; a copy queue operable to store copy jobs waiting to be executed by the image forming device; a copy job controller operable to control copy jobs based on the payment status and a status of the print queue; and a print job controller operable to control print jobs. When the payment information receiver detects that a payment is received for execution of a copy job, the copy job manager is operable to (i) reject the copy job and issue a refund instruction to the billing device on judging that one or more print jobs are stored in the print queue, and (ii) store the copy job in the copy queue on judging that no print job is stored in the print queue. When the print job receiver receives a print job, the print job controller is operable to (i) reject the received print job on judging that the billing device holds any payment received, and (ii) store the received print job in the print queue on judging that the billing device holds no payment received.

In order to solve the problems noted above, another aspect of the present invention provides an image forming device connected to a billing device and an external terminal via a communication network. The image forming device includes: a payment information receiver operable to receive, from the billing device, payment information indicating that the billing device has received a refundable payment; a payment manager operable to manage a status of the payment based on the payment information; a print job receiver operable to receive a print job from the external terminal; a print queue operable to store print jobs waiting to be executed by the image forming device; a copy queue operable to store copy jobs waiting to be executed by the image forming device; a copy job controller operable to control copy jobs based on the payment status and a status of the print queue; and a print job controller operable to control print jobs. When the payment information receiver detects that a payment is received for execution of a copy job, the copy job manager is operable to (i) reject the copy job and issue a refund instruction to the billing device on judging that one or more print jobs are stored in the print queue, and (ii) store the copy job in the copy queue on judging that no print job is stored in the print queue. When the print job receiver receives a print job, the print job controller is operable to (i) reject the received print job on judging that the billing device holds any payment received, and (ii) store the received print job in the print queue on judging that the billing device holds no payment received.

In order to solve the problems noted above, yet another aspect of the present invention provides a job processing method for an image forming device that is connected to a billing device and an external device via a communication network. The image forming device includes: a payment information receiver operable to receive, from the billing device, payment information indicating that the billing device has received a refundable payment; a payment manager operable to manage a status of the payment based on the payment information; a print job receiver operable to receive a print job from the external terminal; a print queue operable to store print jobs waiting to be executed by the image forming device; and a copy queue operable to store copy jobs waiting to be executed by the image forming device. The job processing method includes a copy job processing step and a print job processing step. The copy job processing step includes the sub-steps of: detecting, by the payment information receiver, that a payment is received for execution of a copy job; judging whether any print job is stored in the print queue; rejecting the copy job and issuing a refund notification to the billing device, if it is judged in the judging sub-step that any print job is stored in the print queue; and storing the copy job in the copy queue, if it is judged in the judging sub-step that no print job is stored in the print queue. The print job processing step includes the sub-steps of: receiving, by the print job receiver, a print job; judging, based on the payment information, whether the billing device holds any payment received; rejecting the received print job if it is judged that the billing device holds any payment received; and storing the received print job in the print queue if it is judged that the billing device holds no payment received.

According to the billing and printing system of the above configuration, a print job requested by a subscriber user is rejected, if a payment made earlier by a general user and part or all of the payment still remains unused. Further, if a print job requested earlier by a subscriber user is still being processed, any payment by a general user is not accepted. With this arrangement, no job contention occurs during the time any payment made by a general remains unused.

Since no job contention occurs during the time there is unused payment made by a general user, it is avoided that the general user misunderstands that the payment he has made is used for executing a printing job requested by other users.

BRIEF DESCRIPTION OF THE DRAWINGS

These and the other objects, advantages and features of the invention will become apparent from the following description thereof taken in conjunction with the accompanying drawings which show a specific embodiment of the invention.

In the drawings.

DESCRIPTION OF THE PREFERRED EMBODIMENT

Embodiment 1

Embodiment 1 of the present invention relates to a billing and printing system in which an MFP is connected to a vendor and to an external PC. The MFP exemplifies an image forming device according to the present invention. The vendor accepts payment in cash or by other means. The external PC issues a print job. According to this embodiment, the MFP executes a copy job requested by a general user with a payment made at the vendor and also executes a print job requested by a subscriber user via the network. In addition, the MFP is configured to prevent occurrence of job contention during the time any payment deposited by a general user remains. Note that the vendor mentioned herein refers to a payment receiving device.

<<Configuration>>

Figure 1:
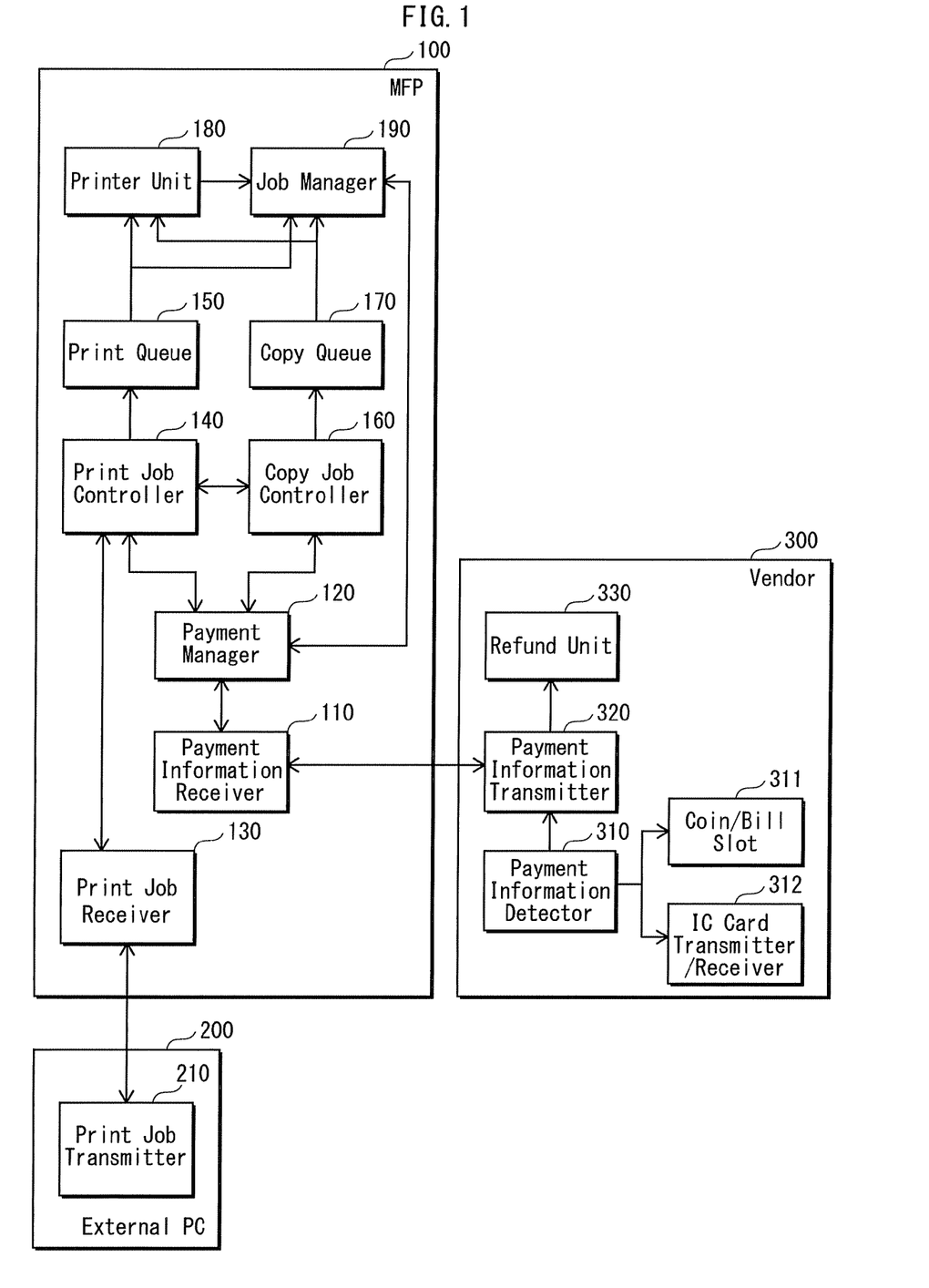
FIG. 1 is a functional block diagram showing a billing and printing system consistent with Embodiment 1 of the present invention.

FIG. 1 is a functional block diagram showing a billing and printing system consistent with Embodiment 1. An MFP 100 is connected locally to a vendor 300 via, for example, a serial interface and also connected to an external PC 200 via a network.

The vendor 300 according to Embodiment 1 receives payment in cash and also accepts payment by IC card.

First of all, the internal configuration of the MFP 100 is described. The MFP 100 includes a payment information receiver 110, a payment manager 120, a print job receiver 130, a print job controller 140, a print queue 150, a copy job controller 160, a copy queue 170, a printer unit 180, and a job manager 190.

The payment information receiver 110 receives payment information from the vendor 300. Payment information indicates the amount of payment made by a general user at the vendor 300 or the amount of refund provided to the general user by the vendor 300.

The payment manager 120 judges, with reference to the payment information received by the payment information receiver 110, whether any balance of payment is left on the vendor 300.

The print job receiver 130 receives a print job issued by the external PC 200 and transfers the received print job to the print job controller 140.

The print job controller 140 receives a print job transferred from the print job receiver 130 and either accepts or refuses to place the received print job in the print queue 150, depending on the status of payment. Detailed operation of the print job controller 140 will be described below.

The print queue 150 is RAM for storing a sequence of print jobs waiting to be executed. The print jobs placed in the print queue 150 are sequentially transferred to the printer unit 180 and executed.

Upon receipt of a copy job requested by a general user by operating the MFP 100, the copy job controller 160 either accepts or refuses to place the copy job in the copy queue 170, depending on the status of the print queue 150. Upon rejecting the copy job, the copy job controller 160 instructs the payment manager 120 to refund the payment to the general user. Detailed operation of the copy job controller 160 will be described below.

The copy queue 170 is RAM for storing a sequence of copy jobs waiting to be executed. The copy jobs placed in the copy queue 170 are sequentially transferred to the printer unit 180 and executed.

The printer unit 180 sequentially executes jobs in the print queue 150 and the copy queue 170 by printing image data stored on the queue for the respective jobs. The printer unit 180 may use an electrostatic printing process to print a tonner image on plain paper by toner transfer and fixing.

The job manager 190 instructs the printer unit 180 to sequentially execute jobs stored in the copy queue 170 and the print queue 150. In addition, upon receipt of a notification about completion of a copy job or about occurrence of Auto-Clear from the printer unit 180, the job manager 190 passes the notification to the payment manager 120. Auto-Clear occurs when a copy job is interrupted.

The external PC 200 includes a print job transmitter 210 and issues a print job to the MFP 100. Note that there may be a plurality of external PCs 200 on the network.

The following now describes the internal configuration of the vendor 300. The vendor 300 includes a payment information detector 310, a coin/bill slot 311, an IC card transmitter/receiver 312, a payment information transmitter 320, and a refund unit 330. According to Embodiment 1, the vendor 300 is able to accept payment of usage fees in cash and by IC card.

The payment information detector 310 detects that a coin or bill is inserted into the coin/bill slot 311 and also detects that an IC card is placed over the IC card transmitter/receiver 312. Upon detecting the insertion of cash, the payment information detector 310 detects the amount of money inserted. Upon detecting the presence of an IC card, the payment information detector 310 prompts the general user to input the amount of payment to be made to the vendor 300. The vendor 300 is provided with buttons and a display panel for allowing such a user input.

The payment information transmitter 320 transmits payment information detected by the payment information detector 310 to the MFP 100. In response to a refund instruction from the MFP 100, the payment information transmitter 320 instructs the refund unit 330 to make a refund.

The refund unit 330 makes a refund in response to a refund instruction received from the MFP 10 0 via the payment information transmitter 320. A refund is made upon completion of a copy job or deletion of a copy job, which occurs subsequently to Auto-Clear, to return the remainder of payment deposited by the general user, based on the payment information. A refund of payment made in cash is provided in cash, whereas a refund of payment made by IC card is provided by increasing the amount of money stored on the IC card.

Figure 2:
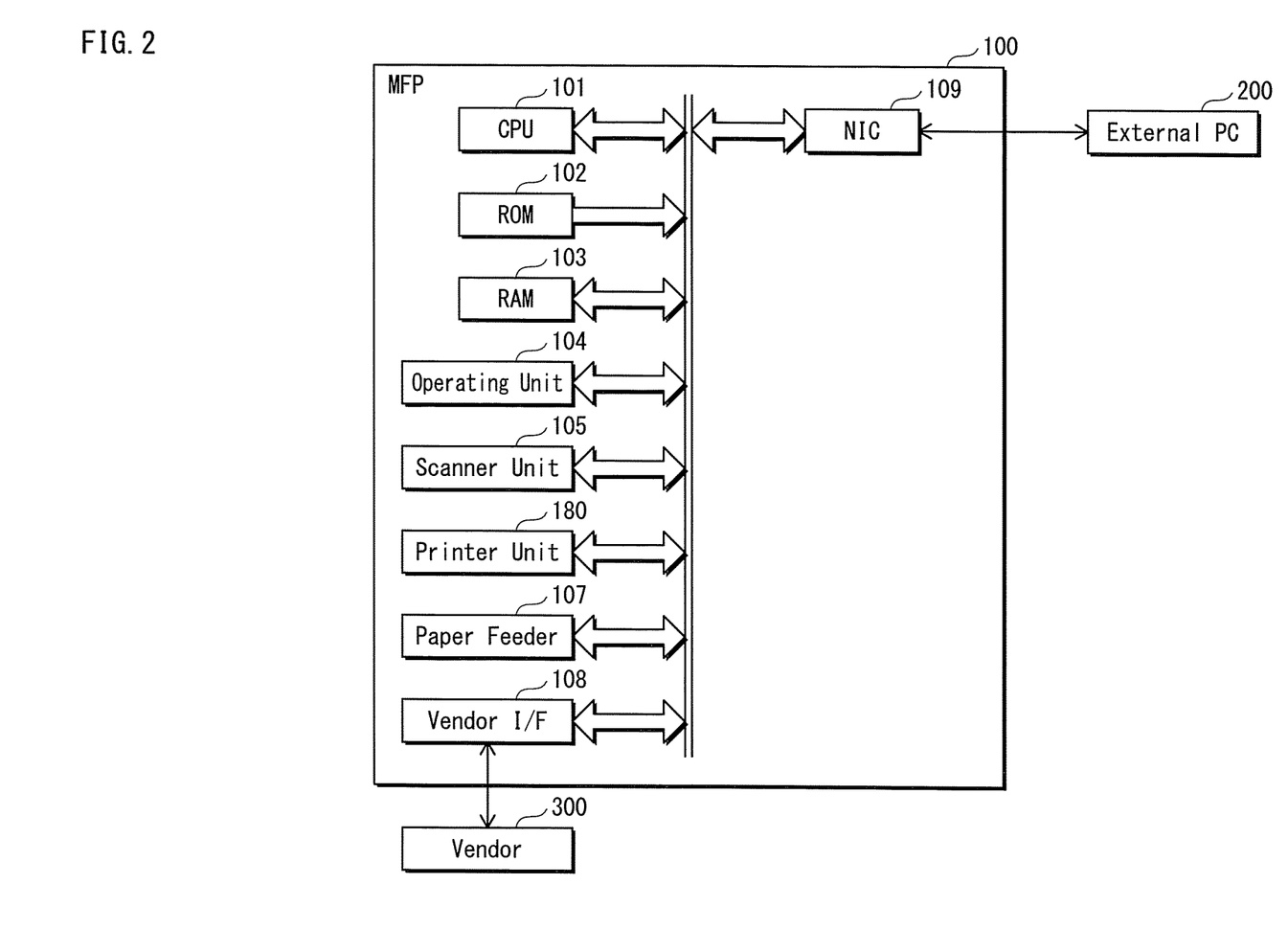
FIG. 2 is a view showing the hardware configuration of an MFP 100 included in the billing and printing system.

The following now describes the hardware configuration of the MFP 100. FIG. 2 is a view showing the hardware configuration of the MFP 100. The MFP 100 includes a CPU 101, ROM 102, RAM 103, an operating unit 104, a scanner unit 105, the printer unit 180, a paper feeder 107, a vendor I/F 108 and a Network Interface Card (hereinafter, simply "NIC") 109.

The CPU 101 is a processor that performs most of the processes done by the MFP 100, including image processing and communications with the vendor 300 as well as with the external PC 200.

Figure 4:
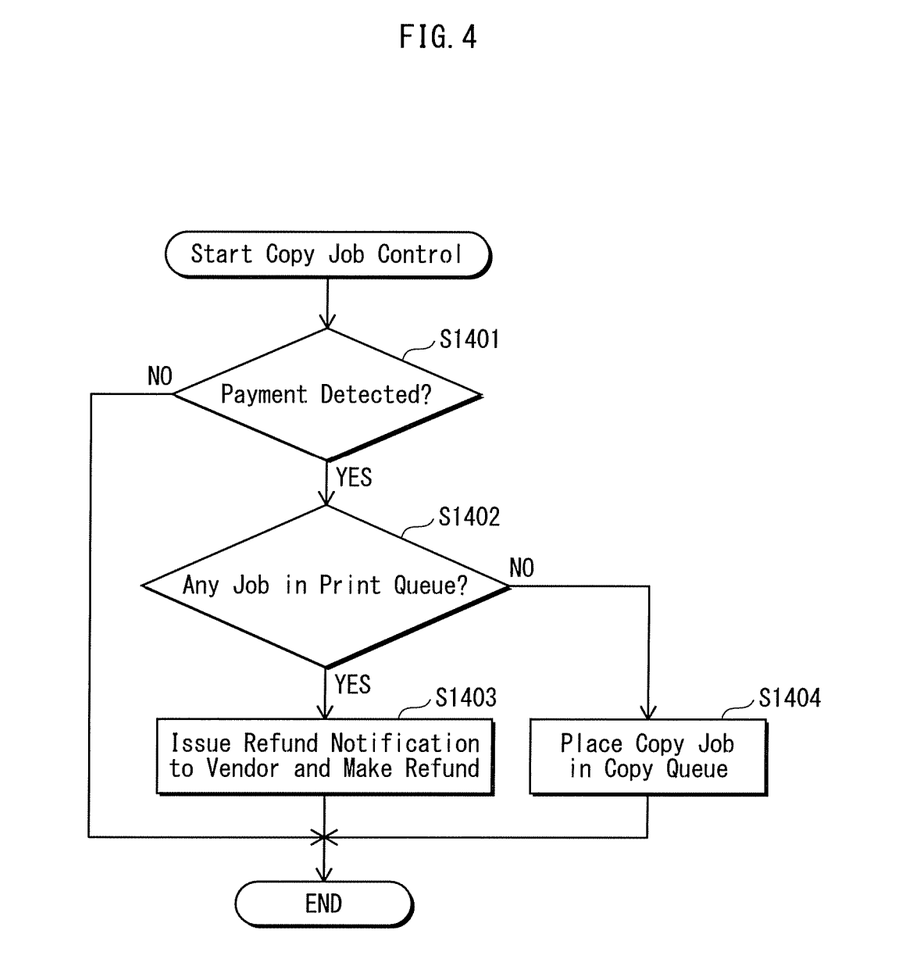
FIG. 4 is a flowchart showing the operation shown in FIG. 3.
Figure 6:
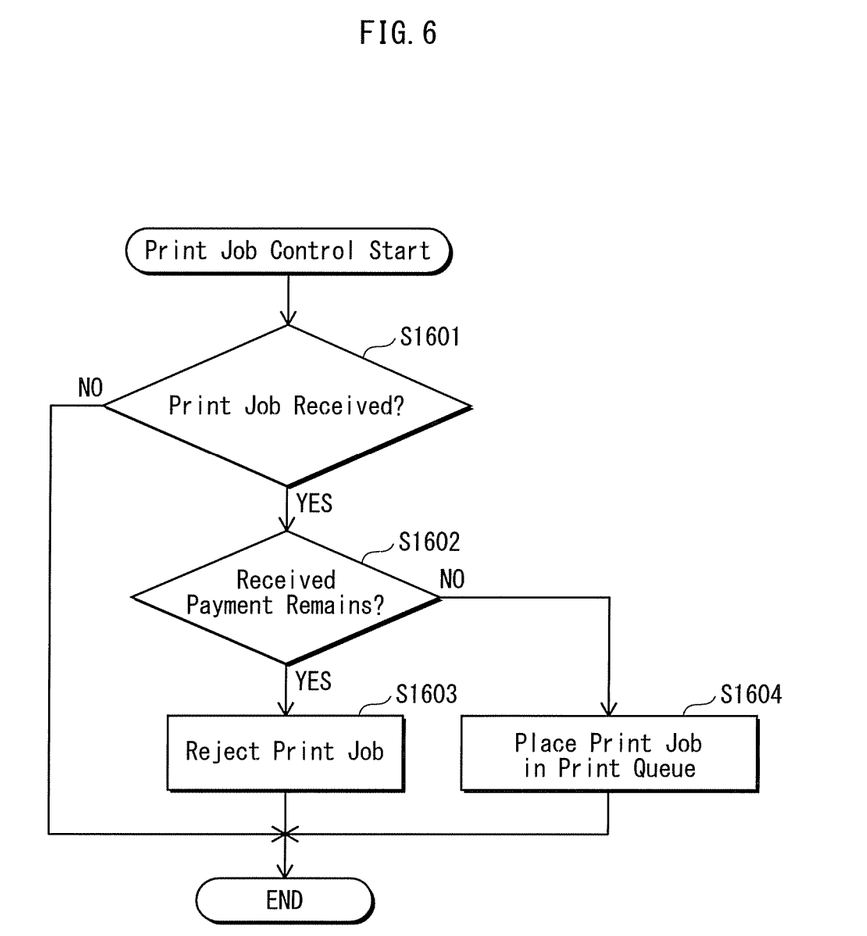
FIG. 6 is a flowchart showing the operation shown in FIG. 5.
Figure 7:
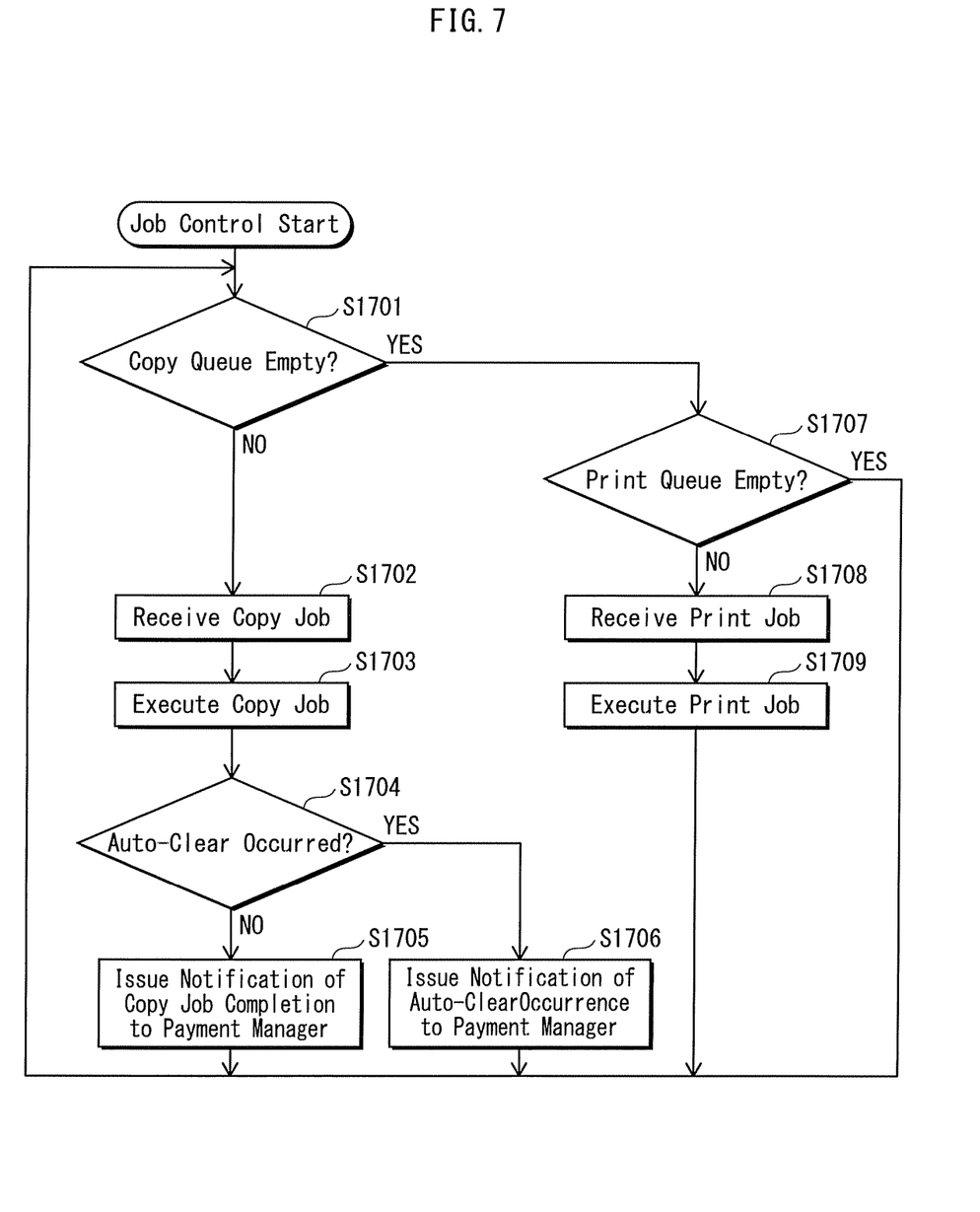
FIG. 7 is a flowchart showing the operation for job execution control.

The ROM 102 stores programs for causing, when read and executed by the CPU 101, a sequence of processing steps shown by flowcharts in FIGS. 4, 6 and 7. The contents of each, program will be described, later.

The RAM 103 is used to temporarily store various data and information, including image data and information about job setting. The image data includes image data scanned by the scanner unit 105 in the process of a copy job requested by a general user as well as image data received from the external PC 200 in the process of a print job requested by a subscriber user. It is applicable to use separate pieces of RAM for the copy queue 170 storing the former image data and for the print queue 150 storing the latter image data. Alternatively, different storage locations of a single piece of RAM may be used. In the configuration shown in FIG. 2, the RAM 103 is a single piece of memory module.

The operating unit 104 is composed of buttons, a panel and the like for receiving user operations. To be more specific, the operating unit 104 includes a panel used to make job setting, such as selection of a paper size and the number of copies, a start button to start a job, and a stop button to stop a job being processed.

The scanner unit 105 scans an original and transmits the scanned image data to the RAM 103.

The printer unit 180 sequentially prints image data placed in the copy queue 170 and the print queue 150 both residing on the RAM 103.

The paper feeder 107 feeds paper for printing by the printer unit 180, according to the paper selection made at the time of the job setting.

The vendor I/F 108 performs communications with the vendor 300. More specifically, the vendor I/F 108 requests, each time a copy job completes, the vendor 300 to subtract the fee for the copying from the amount of payment having been deposited. In addition, on receiving from the vendor 300 a signal indicating that the deposited payment falls short, the vendor I/F 108 informs the CPU 101 of the situation.

The NIC 109 is an interface with the external PC 200 residing on the network.

<<Operation>>

The following now describes operation of the MFP 100 according to the present embodiment. The MFP 100 is commonly used for copying by a general user and printing by a subscriber user. In either case, the MFP 100 operates to prevent any occurrence of contention between jobs as long as there is any payment made by a general user left unused. The following provides more detailed description based on specific examples.

<Copy Job Requested by General User>

Figure 3:
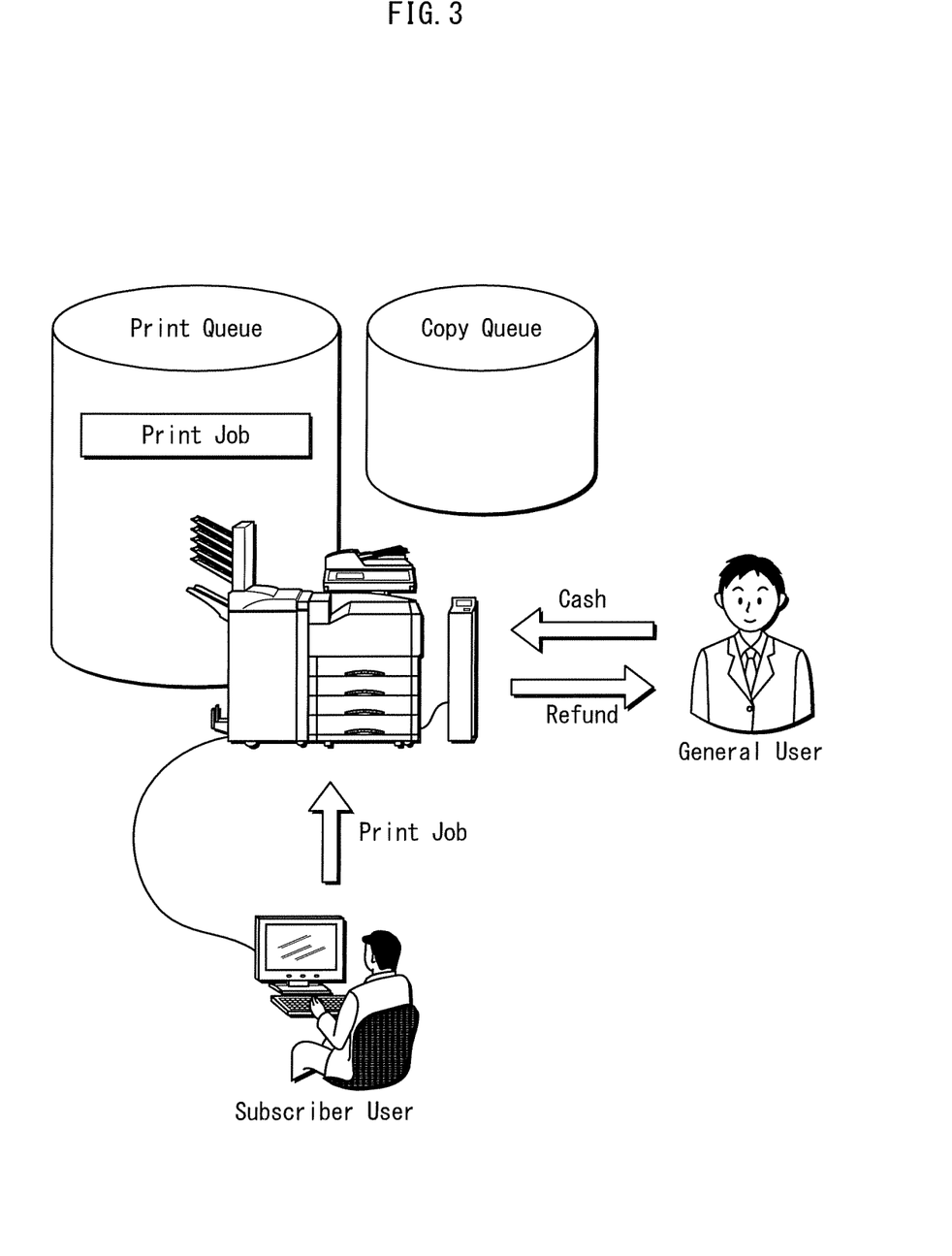
FIG. 3 is a schematic view illustrating the operation of the MFP 100 performed when a general user requests a copy job.

In the following part, the operation of the MFP 100 performed in response to a request for a copy job by a general user is described. FIG. 3 is a schematic view illustrating the operation of the MFP 100 performed when a general user requests a copy job in contention with another job.

Suppose that there is no print job transmitted by a subscriber user. Under this condition, when a general user inserts a coin or bill to the vendor 300 and has an original scanned by the MFP 100, the MFP 100 stores the scanned image as a copy job in the copy queue 170. The queued copy job is later printed at the earliest possible timing.

On the other hand, suppose that there is a print job requested by a subscriber user and the print job is placed in the print queue 150. Under this condition, the MFP 100 operates to immediately return the cash inserted by a general user.

FIG. 4 is a flowchart showing the above operation. A program for realizing the operation shown in FIG. 4 is executed by the copy job controller 160 shown in FIG. 1.

First, the copy job controller 160 judges whether any payment has been detected (S1401). Payment is said to be detected by detecting the moment at which a general user inserts a coin or bill into the coin/bill slot 311 or places an IC card over the IC card transmitter/receiver 312. The judgment in Step S1401 is made by the copy job controller 160 by issuing an inquiry to the payment manager 120. The payment manager 120 refers to payment information received from the vendor 300 via the payment information receiver 110 to inform the copy job controller 160 as to whether any payment has been made.

If it is judged that no payment has been detected (S1401: N), the copy job controller 160 terminates the processing without any further operation.

If it is judged that a payment is detected (S1401 Y), the copy job controller 160 then judges whether any print job is stored in the print queue 150 (S1402). The judgment in Step S1402 is made by issuing an inquiry to the print job controller 140. In response, the print job controller 140 reads the print queue 150 and informs the copy job controller 160 as to whether there is any print job stored in the print queue 150.

If any print job is stored in the print queue 150 (S1402: Y), the copy job controller 160 issues a refund instruction to the vendor 300 to make a refund of the received payment to the general user (S1403).

On the other hand, if no print job is stored in the print queue 150 (S1402: N), the copy job controller 160 places the copy job in the copy queue 170 (S1404).

The queued copy job is eventually executed according to the flowchart shown in FIG. 7.

As set forth above, the MFP 100 is configured to reject any payment by a general user as long as there is any print job requested by a subscriber user is stored in the print queue 150. This achieves to eliminate the risk of giving a general user a wrong idea that the payment he has made is used on a print job requested by other users.

<Print Job Requested by Subscriber User>

Figure 5:
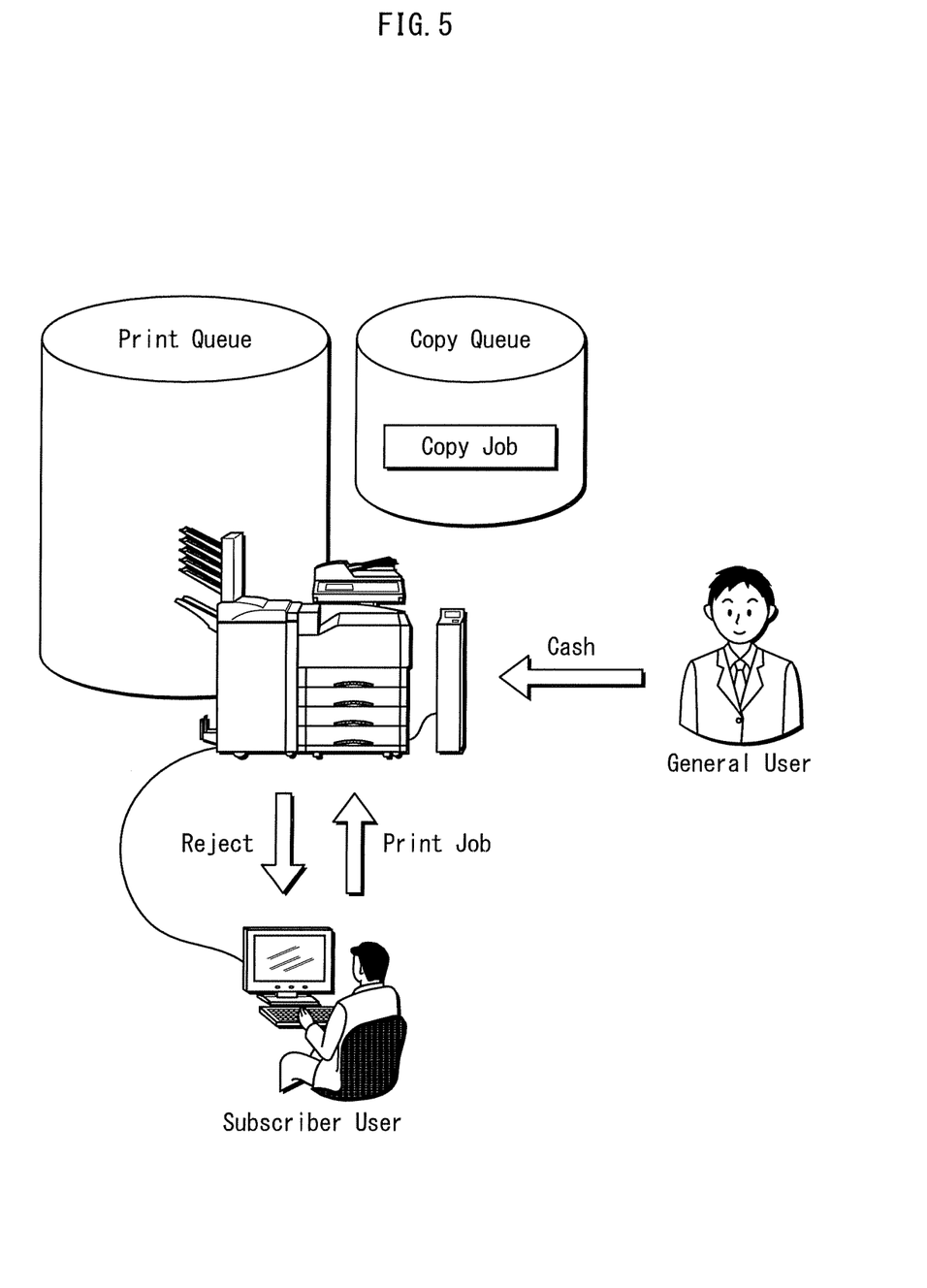
FIG. 5 is a schematic view illustrating the operation of the MFP 100 performed when a subscriber user requests a print job.

In the following part, the operation of the MFP 100 performed in response to a request for a print job by a subscriber user is described. FIG. 5 is a schematic view showing the operation of the MFP 100 performed when a subscriber user requests a copy job in contention with another job.

If there is no copy job requested by a general user, a print job transmitted from the external PC 200 to the MFP 100 at a request by a subscriber user is placed in the print queue 150. The queued print job is later executed at the earliest possible timing.

On the other hand, if there is a payment made by general user, the MFP accepts no further print job.

FIG. 6 is a flowchart showing the above operation. A program for realizing the operation shown in FIG. 6 is executed by the print job controller 140 shown in FIG. 1.

First, the print job controller 140 judges whether or not any print job has been received (S1601). The print job controller 140 judges that a print job is received upon receipt of a signal that is issued by the print job receiver 130 upon receipt of a print job from the external PC 200.

If it is judged that no print job is received (S1601: N), the print job controller 140 terminates the processing without any further operation.

If it is judged that a print job is received (S1601: Y), the print job controller 140 then judges whether any payment has been made and left unused on the vendor 300 (S1602). The print job controller 140 makes this judgment in Step S1602 by issuing an inquiry to the payment manager 120. The payment manager 120 refers to the payment information received from the vendor 300 via the payment information receiver 110 and informs the print job controller 140 as to whether any payment has been made to the vendor 300.

If there is any payment (S1602 Y), the print job controller 140 does not place the received print job in the print queue 150 and instructs the print job receiver 130 to issue, to the external PC 200 that transmitted the print job, a notification that the requested print job is rejected (S1603).

If no payment is made (S1602: N), the print job controller 140 places the print job in the print queue 150 (S1604).

The queued print job is executed in according to the flowchart shown in FIG. 7.

As set forth above, the MFP 100 is configured to reject any print job requested by a subscriber user as long as there is a payment made to the vendor 300 by a general user. This achieves to eliminate the risk of giving a general user a wrong idea that payment he made is used on a print job requested by other users.

<Job Control>

In the following part, the job control operation of the MFP 100 performed to execute jobs placed in the copy queue 170 and the print queue 150 is described. FIG. 7 is the flowchart showing the operation for job execution.

First, the job manager 190 judges whether the copy queue 170 is empty or not (S1701). On judging that the copy queue 170 is not empty (S1701: N), the job manager 190 instructs the printer unit 180 to acquire a copy job placed at the top of the copy queue 170 (S1702) and executes the acquired copy job (S1703).

The printer unit 180 judges whether or not the copy job is interrupted during execution and thus Auto-Clear occurs (S1704).

If the copy job completes without occurrence of Auto-Clear (S1704: N), the printer unit 180 issues a notification that the copy job completes to the payment manager 120 via the job manager 190 (S1705).

If Auto-Clear occurs before completion of the copy job (S1704: Y), the printer unit 180 issues a notification of occurrence of Auto-Clear to the payment manager 120 via the job manager 190 (S1706).

After the copy job completes or the payment manager 120 is notified about occurrence of Auto-Clear, the processing goes back to Step S1701.

On judging that the copy queue 170 is empty (S1701: Y), the job manager 190 then judges whether the print queue 150 is empty or not (S1707). On judging that the print queue 150 is not empty (S1707: N), the job manager 190 instructs the printer unit 180 to acquire a print job placed at the top of the print queue 150 (S1708) and executes the acquired print job (S1709).

After completion of the print job, the processing goes back to step S1701.

If it is judged that the print queue 150 is empty (S1707: Y), the processing also goes back to step S1701 to wait for any job to be placed in the copy queue 170 or the print queue 150.

<<Effect>>

As described above, the vendor is provided with a coin/bill slot, which allows a general user to make a refundable payment in cash. In such a case, the vendor is able to make a refund in cash.

In addition, the vendor allows a general user to make a refundable payment by IC card. In such a case, the vendor is able to make a refund by appropriately rewiring information on the IC card.

It should be naturally appreciated that the above-described image forming device alone and the above-described job processing method per se both fall within the scope of the present invention. With such a device and method, the present invention provides a system that prevents any job contention during the time there remains any payment. Such a system eliminates the risk that a general user feels concerned about the possibility that payment he made is used by mistake for a print job requested by others.

Embodiment 2

Similarly to Embodiment 1, Embodiment 2 of the present invention is also directed to a billing and printing system. Yet, the MFP 100 according to Embodiment 2 includes, in addition to the print queue 150, another print queue for storing print jobs that are held pending until unused payment is settled. This additional print queue is hereinafter referred to as "pending-state print queue", and the print queue 150 may also be referred to as "normal print queue" for contrast with the pending-state print queue. The provision of the pending-state print queue enables the MFP 100 to temporarily store a print job requested by a subscriber user during the time a payment made by a general user remains unused. Upon completion of a copy job requested by the general user to leave no unused payment, the print job temporarily stored in the pending-state print queue is moved to the normal print queue 150.

Except for the addition of the pending-state print queue to the MFP 100, the billing and printing system according to Embodiment 2 is identical in configuration to that described in Embodiment 1. It should be appreciated that appropriate changes are made to the programs executed by the print job controller 140 so as to accommodate the configuration change.

Figure 8:
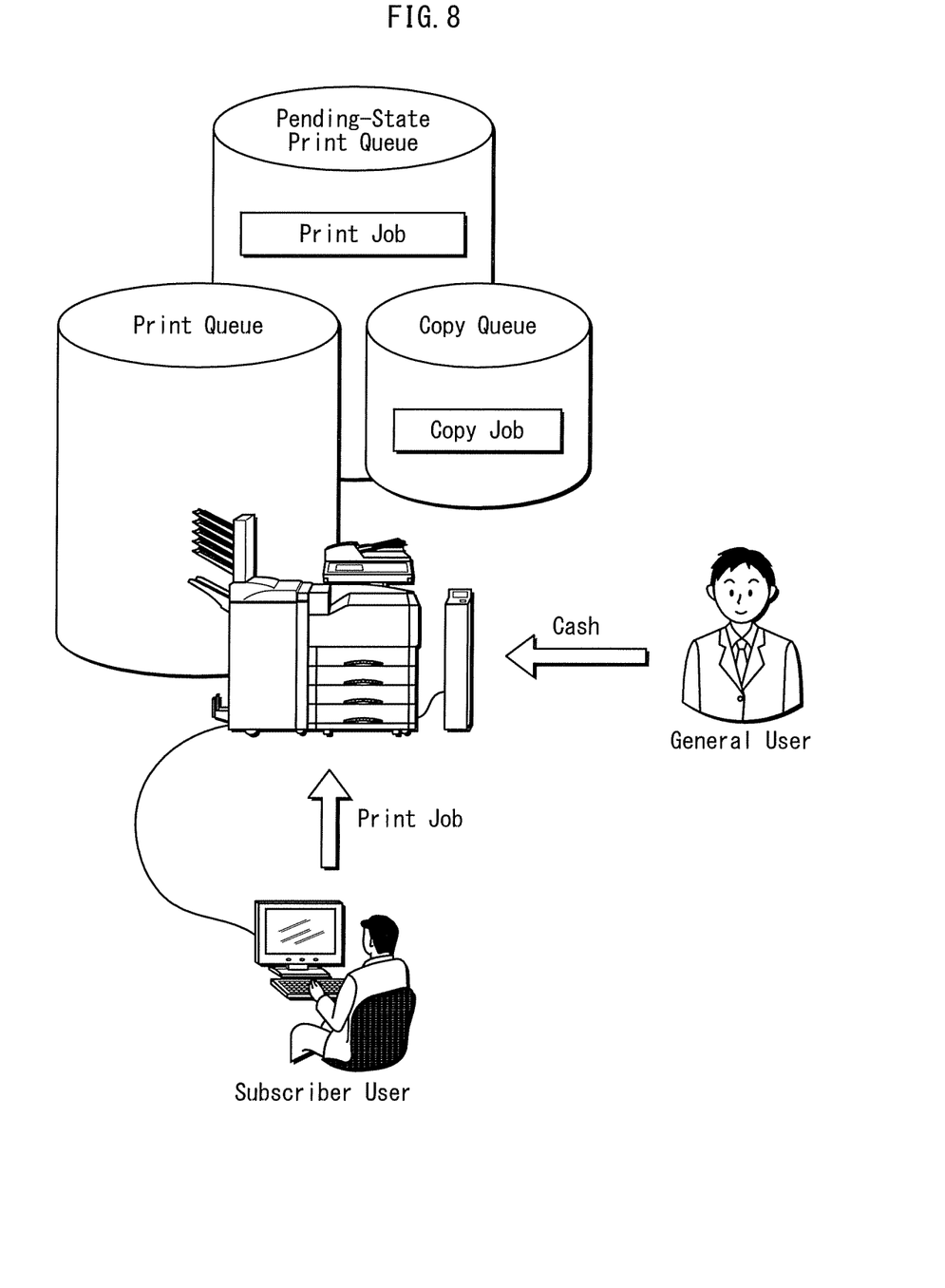
FIG. 8 is a schematic view illustrating the operation of the MFP 100 according to Embodiment 2 performed when a subscriber user requests a print job.

FIG. 8 is a schematic view illustrating the operation of the MFP 100 according to Embodiment 2 performed when a subscriber user requests a print job in contention with another job.

Suppose that no copy job requested by a general user is currently being processed. In such a case, a print job transmitted from the external PC upon request by a subscriber user is placed in the print queue 150. The queued print job is later printed at the earliest possible timing, as described with reference to FIG. 5.

The MFP 100 according to Embodiment 2 operates differently from the operation shown in FIG. 5, when a print job is requested by a subscriber user during the time a payment made by a general user by, for example, inserting a coin or bill remains unused. More specifically, when a print job is request by the subscriber user after a payment is made by a general user, the MFP 100 according to Embodiment 2 does not reject the print job but places the print job in the pending-state print queue. The print job placed in the pending-state print queue is moved to the normal print queue 150 after a copy job requested by the general user completes and thus the payment is exhausted or the reminder is returned to the general user. That is to say, no print job is placed in the normal print queue 150 as long as any payment by a general user remains unused. With this arrangement, no job contention occurs during the time there is unused payment. Further, the MFP 100 is able to accept print jobs requested by subscriber users even if there is unused payment by a general user.

Figure 9:
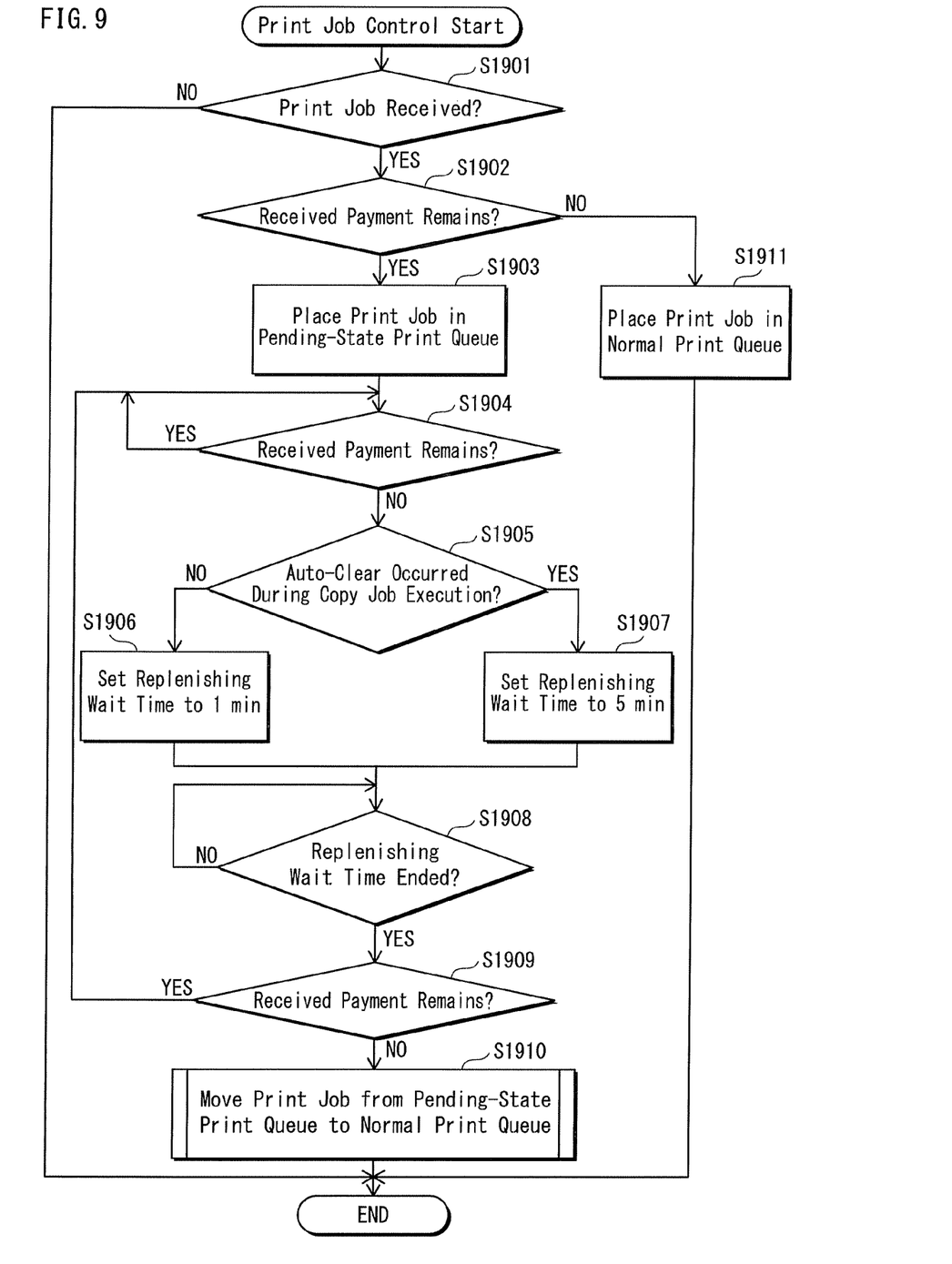
FIG. 9 is a flowchart showing the operation shown in FIG. 8.

FIG. 9 is a flowchart showing the above operation. The processing steps shown in FIG. 9 are basically identical to those shown in FIG. 6, except for steps performed subsequently to the judgment that a payment is made (S1902: Y). The following description is given only to the different processing steps.

When a print job requested by a subscriber user is received (S1901: Y) and the print job controller 140 judges that a payment has been received (S1902: Y), the print job controller 140 places the print job in the pending-state print queue (S1903).

The print job controller 140 waits until the payment is settled by either being exhausted or by making a refund (S1904). This step is performed by the print job controller 140 periodically issuing, to the payment manager 120, an inquiry about whether the received payment still remains.

If the payment is settled (S1904: N), the print job controller 140 issues an inquiry to the payment manager 120 as to whether Auto-Clear occurred during execution of the copy job (S1905). The print job controller 140 makes this inquiry in order to judge whether the payment is settled by making a refund after completion of the copy job to return the reminder of the payment or after the copy job is interrupted due to occurrence of Auto-Clear. The payment manager 120 is a component that receives, from the job manager 190, a notification that Auto-Clear occurs during execution of a copy job and issues a refund instruction to the vendor 300 in response to such a notification. That is to say, the payment manager 120 is in possession of information as to whether Auto-Clear has occurred or not.

The print job controller 140 receives a response to the inquiry from the payment manager 120. If Auto-Clear has not occurred (S1905: N), the print job controller 140 sets a replenishing wait time to 1 minute (S1906). If Auto-Clear has occurred (S1905 Y), the print job controller 140 sets the replenishing wait time to 5 minutes (S1907). The replenishing wait time is a time period during which a general user is allowed to make additional payment to continue or resume copying. In the case where Auto-Clear has occurred and thus the copy job is interrupted before completion, it is likely that the general user will make another payment to resume the interrupted copy job. In view of this, the replenishing wait time is set relatively longer for allowing the general user enough time to make a payment.

After setting the replenishing wait time, the print job controller 140 waits until the set replenishing wait time is over (S1908).

Upon expiry of the replenishing wait time (S1908: Y), the print job controller 140 judges whether another payment has been made (S1909). If a payment has been made (S1909: Y), it means that the general user resumes copying. Thus, the processing goes back to Step S1904. If no payment has been made (S1909: N), the job manager 190 moves all print jobs placed in the pending-state print queue to the normal print queue 150 (S1910). This processing step is described below with reference to the flowchart shown in FIG. 10.

Figure 10:
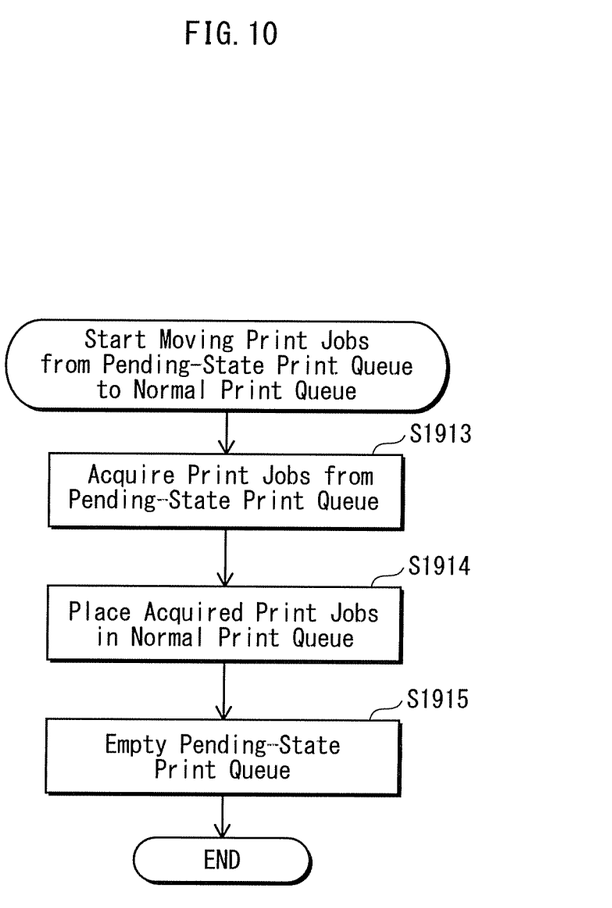
FIG. 10 is a flowchart showing the step of moving print jobs from the pending-state print queue to the normal print queue.

That is, the job manager 190 acquires all print jobs stored in the pending-state print queue (S1913) and places the acquired print jobs to the normal print queue 150 (S1914). Finally, the job manager 190 empties the pending-state print queue (S1915).

As set forth above, with the pending-state print queue, the MFP 100 is enabled to accept print jobs requested by subscriber users even during the time a payment made by a general user remains unused. The thus accepted print jobs are sequentially executed after the payment is exhausted or returned to the general user.

<<Effect>>

As set forth above, the provision of the pending-state print queue enables the MFP according to Embodiment 2 to accept a print job requested by a subscriber user even if a general user has made a payment by that time. Each print job accepted during such a time is placed in the pending-state print queue. The print jobs placed in the pending-state print queue are moved to the normal print queue 150 after the copy job requested by the general user completes and thus the payment received from the general user is settled. The print jobs moved to the normal print queue 150 are duly executed sequentially at an appropriate timing.

According to the present embodiment, the MFP waits for the predetermined time period from the payment received from a general user is settled, before staring jobs stored in the pending-state print queue. This arrangement allows the general user to continue copying by making additional payment before the predetermined time period expires. This holds even if the pending-state print queue stores a print job requested by a general user. For example, if the amount of money paid runs out before a general user completes all the copying he would like to make, the general user is allowed to continue the copying by replenishing the payment within the predetermined time period.

In addition, the MFP according to the present embodiment judges whether the payment is settled as a result of a refund made upon completion of the copy job or upon occurrence of Auto-Clear. On, judging that the refund is made upon occurrence of Auto-Clear, the MFP waits longer before moving the print jobs from the pending-state print queue to the normal state print queue. It is because Auto-Clare is likely to occur when the general user is not aware that the copy job has been interrupted due to an error of some kind or when the general user is not attending the MFP for some reason. If so, it is expected the general user would continue the copying after addressing the error. The MFP according to Embodiment 2 is configured to wait longer in such a case before accepting a new print job, the general user is given sufficient time to address whatever error having occurred.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A billing and printing system having a billing device, an external terminal, and an image processing device, the image processing device being connected to the billing device and to the external terminal via a communication network, the billing device comprising:
    a payment information detector operable to detect payment information indicating that a refundable payment is received;
    a payment information transmitter operable to transmit the payment information to the image forming device; and
    a refund unit operable to make a refund upon receipt of a refund instruction from the image forming device;
    the external terminal comprising:
    a print job transmitter operable to transmit a print job to the image forming device, and
    the image forming device comprising:
    a payment information receiver operable to receive the payment information from the billing device;
    a payment manager operable to manage a status of the payment based on the payment information;
    a print job receiver operable to receive the print job from the external terminal;
    a print queue operable to store print jobs waiting to be executed by the image forming device;
    a copy queue operable to store copy jobs waiting to be executed by the image forming device;
    a copy job controller operable to control copy jobs based on the payment status and a status of the print queue, wherein the copy job controller judges the payment status by communicating with the payment information receiver and the copy job controller judges the print queue status by communicating with a print job controller; and
    the print job controller operable to control print jobs, wherein the print job controller judges when a print job is received by communicating with the print job receiver, wherein
    when the copy job controller judges that a payment is received for execution of a copy job, the copy job controller is operable to (i) reject the copy job and issue a refund instruction to the billing device on judging that one or more print jobs are stored in the print queue, and (ii) store the copy job in the copy queue on judging that no print job is stored in the print queue, and
    when the print job controller judges that a print job is received, the print job controller is operable to (i) reject the received print job on judging that the billing device holds any payment received, and (ii) store the received print job in the print queue on judging that the billing device holds no payment received.

2. The billing and printing system according to claim 1, wherein
    the image forming device further comprising:
    a pending-state print queue that is a different queue from the print queue; and
    a pending-state print job controller operable to control print jobs stored in the pending-state print queue, wherein
    on judging that the billing device holds any payment received, the print job controller is operable to store the rejected print job in the pending-state print queue, and
    the pending-state print job controller is operable to regularly inquire of the payment manager about the payment status and to instruct, on judging that the billing device holds no payment received, the print job controller to move the rejected print job stored in the pending-state print queue to the print queue.

3. The billing and printing system according to claim 2, wherein
    the pending-state print job controller is operable to issue the instruction to the print job controller a predetermined time period after the payment manager judges that the billing device holds no payment received.

4. The billing and printing system according to claim 3, wherein
    the payment manager is operable to judge whether the billing device holds no payment received as a result of a refund made upon completion of the copy job or as a result of occurrence of Auto-Clear, and
    a duration of the predetermined time period differs depending on whether the refund is made upon completion of the copy job or upon occurrence of Auto-Clear.

5. The billing and printing system according to claim 1, wherein
    the billing device further comprises a payment receiving device,
    the refundable payment is made by entering cash into the payment receiving device, and
    the refund is made by dispensing cash by the payment receiving device.

6. The billing and printing system according to claim 1, wherein
    the refundable payment is made by an IC card, and
    the refund is made by increasing an amount of money stored on the IC card.

7. An image forming device connected to a billing device and an external terminal via a communication network, the image forming device comprising:

a payment information receiver operable to receive, from the billing device, payment information indicating that the billing device has received a refundable payment;

a payment manager operable to manage a status of the payment based on the payment information;

a print job receiver operable to receive a print job from the external terminal;

a print queue operable to store print jobs waiting to be executed by the image forming device;

a copy queue operable to store copy jobs waiting to be executed by the image forming device;

a copy job controller operable to control copy jobs based on the payment status and a status of the print queue, wherein the copy job controller judges the payment status by communicating with the payment information receiver and the copy job controller judges the print queue status by communicating with a print job controller; and the print job controller operable to control print jobs, wherein the print job controller judges when a print job is received by communicating with the print job receiver, wherein when the copy job controller judges that a payment is received for execution of a copy job, the copy job controller is operable to (i) reject the copy job and issue a refund instruction to the billing device on judging that one or more print jobs are stored in the print queue, and (ii) store the copy job in the copy queue on judging that no print job is stored in the print queue, and when the print job controller judges that a print job is received, the print job controller is operable to (i) reject the received print job on judging that the billing device holds any payment received, and (ii) store the received print job in the print queue on judging that the billing device holds no payment received.

8. The image forming device according to claim 7, further comprising:

a pending-state print queue that is a different queue from the print queue; and a pending-state print job controller operable to control print jobs stored in the pending-state print queue, wherein on judging that the billing device holds any payment received, the print job controller is operable to store the rejected print job in the pending-state print queue, and the pending-state print job controller is operable to regularly inquire of the payment manager about the payment status and to instruct, on judging that the billing device holds no payment received, the print job controller to move the rejected print job stored in the pending-state print queue to the print queue.

9. The image forming device according to claim 8, wherein the pending-state print job controller is operable to issue the instruction to the print job controller a predetermined time period after the payment manager judges that the billing device holds no payment received.

10. The image forming device according to claim 9, wherein the payment manager is operable to judge whether the billing device holds no payment received as a result of a refund made upon completion of the copy job or as a result of occurrence of Auto-Clear, and a duration of the predetermined time period differs depending on whether the refund is made upon completion of the copy job or upon occurrence of Auto-Clear.

11. A job processing method for an image forming device, the image forming device being connected to a billing device and an external device via a communication network and including:

a payment information receiver operable to receive, from the billing device, payment information indicating that the billing device has received a refundable payment;

a payment manager operable to manage a status of the payment based on the payment information;

a print job receiver operable to receive a print job from the external terminal;

a print queue operable to store print jobs waiting to be executed by the image forming device; and a copy queue operable to store copy jobs waiting to be executed by the image forming device, the method comprising a copy job processing step and a print job processing step, the copy job processing step comprising the sub-steps of:

detecting, by the payment information receiver, that a payment is received for execution of a copy job;

judging whether any print job is stored in the print queue; and rejecting the copy job and issuing a refund notification to the billing device, if it is judged in the judging sub-step that any print job is stored in the print queue, and the print job processing step comprising the sub-steps of:

receiving, by the print job receiver, a print job;

judging, based on the payment information, whether the billing device holds any payment received; and rejecting the received print job if it is judged that the billing device holds any payment received.

12. The job processing method according to claim 11, wherein the copy job processing step further comprises storing the copy job in the copy queue, if it is judged in the judging sub-step that no print job is stored in the print queue.

13. The job processing method according to claim 11, wherein the print job processing step further comprises storing the received print job in the print queue if it is judged that the billing device holds no payment received.

14. A billing and printing system having a billing device, an external terminal, and an image processing device, the image processing device being connected to the billing device and to the external terminal via a communication network, the billing device comprising:

a payment information detector operable to detect payment information indicating that a refundable payment is received;

a payment information transmitter operable to transmit the payment information to the image forming device; and a refund unit operable to make a refund upon receipt of a refund instruction from the image forming device;

the external terminal comprising:

a print job transmitter operable to transmit a print job to the image forming device, and the image forming device comprising:

a payment information receiver operable to receive the payment information from the billing device;

a payment manager operable to manage a status of the payment based on the payment information;

a print job receiver operable to receive the print job from the external terminal;

a print queue operable to store print jobs waiting to be executed by the image forming device;

a copy queue operable to store copy jobs waiting to be executed by the image forming device;

a copy job controller operable to control copy jobs based on the payment status and a status of the print queue, wherein the copy job controller judges the payment status by communicating with the payment information receiver and the copy job controller judges the print queue status by communicating with a print job controller; and the print job controller operable to control print jobs, wherein the print job controller judges when a print job is received by communicating with the print job receiver, wherein when the copy job controller judges that a payment is received for execution of a copy job, the copy job controller is operable to reject the copy job and issue a refund instruction to the billing device on judging that one or more print jobs are stored in the print queue; and when the print job controller judges that a print job is received, the print job controller is operable to reject the received print job on judging that the billing device holds any payment received.

15. The billing and printing system according to claim 14, wherein the copy job controller is operable to store the copy job in the copy queue on judging that no print job is stored in the print queue.

16. The billing and printing system according to claim 14, wherein the print job controller is operable to store the received print job in the print queue on judging that the billing device holds no payment received.

* * * * *